United States Patent Office 3,453,274
Patented July 1, 1969

3,453,274
PRODUCTION OF CHLORINATED
CYANURIC ACID
Julian Michael Murrin, Charleston, W. Va., and Raymond August Olson, Westfield, N.J., assignors to FMC Corporation, New York, N.Y., a corporation of Delaware
No Drawing. Filed Feb. 15, 1967, Ser. No. 616,153
Int. Cl. C07d 57/34
U.S. Cl. 260—248                                15 Claims

ABSTRACT OF THE DISCLOSURE

Chlorinated cyanuric acid of increased crystal size is obtained by chlorinating an aqueous alkali metal cyanurate with elemental chlorine in the presence of a surface active, alkali metal alkylbenzene sulfonate while maintaining the pH of the resulting slurry of precipitated chlorinated cyanuric acid between about 1.0 to 4.5. The addition of aqueous alkali metal hydroxide to the slurry while maintaining it at a pH between about 3.0 to 4.5 also increases crystal size. Preferably the alkali metal hydroxide is added to the chlorinated cyanuric acid slurry containing the alkali metal sulfonic while the pH of the slurry is maintained between about 3.0 and 4.5.

BACKGROUND OF THE INVENTION

Field of the invention

This invention relates to an improvement in the production of chlorinated cyanuric acid. More particularly, the invention pertains to a chlorinated cyanuric acid product of increased crystal size and a method of preparing it.

Description of the prior art

In the production of chlorinated cyanuric acid it is the common practice to feed cyanuric acid along with aqueous alkali (in molar ratio corresponding to the number of chlorine atoms to be attached) and chlorine to an aqueous reaction zone maintained at a pH no higher than 9; essentially stoichiometric proportions of reactants are employed. Crude chlorinated cyanuric acid precipitates from the solution as a solid slurry.

The reaction is preferably carried out in two stages during the first of which a substantial part of the reaction takes place at a pH of 5 to 9. The resulting partially chlorinated product is removed from the first-stage and passed into a second reaction zone along with additional chlorine where the final reaction occurs at pH of 1.5 to 3.5. This further chlorinated product is removed from the second reaction in the form of a slurry and the solid separated, washed and dried. A more detailed description of the process is set forth in U.S. Patent 2,969,360 to R. H. Westfall to which reference is hereby made.

The steps separating the crude chlorinated cyanuric acid from the aqueous medium and washing this product have given rise to a serious problem. The chlorinated cyanuric acid crystals obtained from this reaction average less than 500 sq. microns in cross sectional area for trichlorocyanuric acid and are 150 sq. microns for dichlorocyanuric acid and as such are difficult to separate from the mother liquor and to wash. Effective filtration of the crystals on a commercial scale and in high yields is thus a troublesome and lengthy operation.

An improved chlorinated cyanuric acid is obtained by a technique described in U.S. Patent 3,120,522 to Olson et al. in which certain chlorinated hydrocarbons are added to the reaction mixture from which the chlorinated cyanuric acid precipitates. The effect of the chlorinated hydrocarbons is to increase the crystal size of the chlorinated cyanuric acid thereby resulting in a product which is easier to purify by filtration.

SUMMARY OF THE INVENTION

The present invention is predicated on the discovery that large size crystals of chlorinated cyanuric acid having improved handling properties such as faster filtering and settling rates as well as greater stability can be obtained by permitting the crystals to form in the presence of a minor amount relative to the contents of the reactor, of a crystal promoter taken from the group of surface active, alkali metal alkyl sulfates and alkylaryl sulfonates while maintaining the pH between about 1.0 to 4.5. Preferably, a minor amount relative to the contents of the reactor, of an alkali metal hydroxide, is added to the mixture of chlorinated cyanuric acid and crystal promoter at pH of about 3.0 to 4.5. The combination of alkali metal hydroxide and crystal promoter results in a chlorinated cyanuric acid product having a crystal size up to 26 times that of the normally precipitated acid. Use of the alkali metal hydroxide or surface active sulfonate separately results in an increase of crystal size of at least twofold.

DESCRIPTION OF THE INVENTION AND PREFERRED EMBODIMENTS

The surface active sulfonate crystal promoting agents herein are hydrocarbon sulfonates of alkali metals wherein the hydrocarbon radical contains sufficient carbon atoms so as to constitute a surface active moiety. Typical hydrocarbon radicals include alkylaryl wherein the alkyl portion contains from about 8 to 20 carbon atoms and the aryl portion is benzene or naphthalene; sodium is normally the alkali metal.

The aforedescribed organic sulfonates are known materials which can be purchased on the chemical market under a variety of trademarks and trade designations. For instance Ultrawet is a trademark of a line of sodium alkylaryl sulfonates including both branched and straight alkyl chains. Other trademark names for organic sulfonates are given in the continuing volumes on trademarked chemicals by Zimmerman and Lavine entitled "Handbook of Material Trade Names." A preferred material is the alkylaryl sodium sulfonate known in the trade as AAS which is identified in the table elsewhere herein.

In practicing the invention the surface active alkali metal hydrocarbon sulfonates can be added at any convenient point during the course of the reaction. So far as we can ascertain they should be present at the time the chlorinated cyanuric acid crystals are being formed which begins to occur after the reaction mixture becomes acidic. For optimum crystal growth the sulfonates are present during the final phases of the chlorination while maintaining the pH from between about 1.0 and 4.5. Although effective in themselves as crystal promoters, the surface active alkali metal sulfonates exhibit the most remarkable results when used in combination with an alkali metal hydroxide such as caustic alkali. For instance, the addition of a solution of caustic alkali and sodium dodecylbenzene sulfonic—identified in the table as AAS —to a slurry of chlorinated cyanuric acid results in an increase of crystal size about 26 times of that of the normally precipitated acids. Use of sodium dodecylbenzene sulfonate alone provides a size increase of up to about four times.

We have not as yet determined a mechanism which accounts for the efficiency as crystal promoting agents of the combination of surface active alkali metal sulfonate and alkali metal hydroxide. It is our opinion, however, that the alkali metal hydroxide, when introduced as a caustic solution into the chlorinator vessel, causes local high alkalinity of sufficient magnitude to effect dissolution of the finer chlorinated cyanuric acid crystals which subsequently redeposit or recrystallize into larger crystals.

Apparently, such crystallization in the presence of the surface active sulfonate favors formation of large crystals at the expense of the smaller ones. Even caustic solution alone is effective as a crystal promoter—2 to 4 times the crystal size of the normally precipitated acid—when added to the chlorinated cyanuric acid slurry thereby lending some evidence to the suggestion that the alkali causes local dissolution at its point of introduction followed by redeposition of crystals having larger grain size. Redeposition of the crystals is believed to occur when the zone of locally dissolved cyanuric acid moves out and away from its location near the alkali stream and mingles with the bulk of the chlorinator contents which are sufficiently acidic at an overall pH of about 1.0 to 4.5 to neutralize and precipitate the small volume of dissolved, chlorinated cyanuric acid.

The above suggested mechanism is given only by way of theory and is not to be taken as imposing any limitation or restriction on the invention.

The crystal promoting agents herein are used in minor amounts relative to the contents of the reactor vessel. In the case of the surface active, hydrocarbon sulfonates, the recommended range is from about 50 p.p.m. to about 500 p.p.m., the optimum being about 150 p.p.m. In the case of the alkali metal hydroxide, it is used in amounts sufficient to maintain the pH in the vicinity of about 3.0 to 4.5. Generally speaking, the preferred range is from about 500 p.p.m. to about 5000 p.p.m., with optimum performance being at about 1750 p.p.m. As previously pointed out the combination of an alkali metal hydroxide and surface active hydrocarbon sulfonate produces the greatest increase in crystal size of the chlorinated cyanuric acid.

It has been our experience that the surface active alkali metal hydrocarbon sulfonates are desirably introduced into the reaction mixture during the second stage chlorination of the two-stage chlorination of an alkali metal cyanurate. However, they are amenable to the single stage chlorination of an alkali metal cyanurate including semi-continuous and continuous operation. When operating on a semi-continuous basis the alkali is added in increments along with the chlorine such that the pH never exceeds 9. The final pH of the batch is adjusted to the herein designated limits and the sulfonate added during the precipitation of the chlorinated cyanuric acid.

When operating continuously in a single stage the reaction zone is maintained at the herein specified pH while the reactants are fed in and the products continuously removed from a single reaction zone. Because of the difficulty controlling three streams of reactants and the desirability of precisely maintaining the ratio of alkali to cyanuric acid, the alkali and cyanuric acid are preferably fed into the reaction mixture together and the pH controlled by the rate at which chlorine is added.

When making dichlorocyanuric acid, the pH of the reaction mixture is preferably regulated between about 5 and 9 in the first stage of the two-stage process. About one-half of the chlorine is introduced during the first step. When making trichlorocyanuric acid, about 60–65% of the total chlorine should be utilized in the first step of the reaction and similarly the pH is desirably held at about 5 to 9. After overflowing from the first chlorination stage the reaction mixture is fed continuously into the second stage along with fresh chlorine. In this second stage the chlorine feed is adjusted so that the pH of the reaction mixture is maintained at the herein specified ranges. In these pH ranges the solubility of the dichlorocyanuric acid and trichlorocyanuric acid in the reaction liquid is low, yet the absorption of chlorine is sufficiently rapid so that chlorination goes essentialy to completeness with concomitant precipitation of the chlorinated acid. By introducing the surface active alkali metal hydrocarbon sulfonate crystal promoters of the invention into the reaction mixture during the second stage of the chlorination a product slurry is withdrawn containing chlorinated cyanuric acid product having larger crystals than heretofore realizable.

When using an alkali metal hydroxide as a crystal promoting agent it is introduced into a slurry of the chlorinated cyanuric acid. Preferably the alkali metal hydroxide is an aqueous solution of caustic alkali introduced into the second-stage chlorinator containing the chlorinated cyanuric acid slurry while maintaining the overall pH of the second stage reactor contents from about 3.0 to about 4.5, the optimum pH being about 3.5–4.0. As pointed out elsewhere herein, in order to attain the largest crystal size of the chlorinated cyanuric acid, the caustic alkali is introduced into the second-stage chlorinator vessel containing a mixture of the chlorinated cyanuric acid slurry and the surface active alkali metal sulfonate.

The examples set forth below are given by way of illustrating the present invention and are not to be deemed limitative thereof. Examples 1 through 6 describe the preparation of trichlorocyanuric acid while Example 7 sets forth the preparation of dichlorocyanuric acid. Example 8 illustrates the effect of caustic in increasing crystal size of the product. The table preceding the examples defines the surface active materials.

TABLE.—SURFACE ACTIVE CHEMICALS

| Abbreviation | General name | Trade name | Composition | Supplier or manufacturer |
| --- | --- | --- | --- | --- |
| (1) AAS | Alkylaryl sodium sulfonate 90% min., sodium sulfate 10% max. | Ultrawet K "Hard." | Alkyl group is a mixture of hydrocarbons containing 8 to 14 carbon atoms with an average of 12 carbon atoms. Aryl group is benzene. | Atlantic Refining. |
| (2) LAAS | Linear alkylaryl sodium sulfonate 90% min., sodium sulfate 10% max. | Ultrawet K "Soft." | The same as above except the alkyl group is a mixture of linear hydrocarbons. | Do. |
| (3) SLS | Sodium laurylsulfate | | $NaC_{12}H_{25}SO_4$ | |
| (4) LAS | Linear alkyl benzene sodium sulfonate. | | Linear dodecyl benzene sodium sulfonate $\approx$99%. | Fisher. |
| (5) ABS | Alkyl benzene sodium sulfonate 85% min., $Na_2SO_4$ 15% max. | Sorapon SF-78. | Alkyl group is a mixture of hydrocarbons containing 8 to 14 carbon atoms. | General Aniline and film. |

EXAMPLE 1.—TWO-STAGE CONTINUOUS CHLORINATION

Two cylindrical reactors having capacities of 0.75 liter and 1.6 liters, respectively, were fabricated from 90 mm. O.D. Pyrex tubing having respective lengths of 180 and 300 mm. The reactors were spherical at the bottom and enclosed with a rubber stopper at the top. Each contained a side arm for continuous overflow of the slurry product. The slurry feed and chlorine inlet tubes, pH electrodes, thermometer, bearing for the stirrer, and the vent tube were all assembled as an integral part of the rubber stopper. Dry Ice-acetone baths were used to maintain the temperature in both reactors at 15 to 20° C. The feed slurry was introduced in the first reactor through a straight tube extending close to the upper surface of a stirrer blade. Chlorine was introduced through a tube drawn to a tip, so that the chlorine impinged on the stirrer blades. The paddle-shaped stirrer blades were rotated at about 1,400 r.p.m. The pH measurements were made with a glass-calomel electrode assembly immersed in the reactor slurry. The vent tubes were open to atmospheric pressure.

The feed slurry was prepared by adding purified cyanuric acid to 6.76 to 6.86 weight percent sodium hydroxide solution to give 3.35 to 3.40 range of mole ratio of caustic to cyanuric acid. This resulted in a 9.83% solution of trisodium cyanurate. The run was started by filling the first reactor (0.75 liter) with feed solution and adding chlorine until the pH dropped to about 5.0. The feed slurry was then pumped in at a constant rate of about 20 ml./minute. Pure chlorine was fed into the mixture at a rate of about 1.6 gm./minute to maintain the pH at 5.0. The reaction mixture of the first-stage reactor was permitted to constantly overflow into the second-stage reactor (1.6 liters capacity) and chlorine was introduced into the second-stage reactor at about 0.82 gm./minute, to maintain the pH below about 2 in the absence of added alkali. The average retention times in the first and second-stage reactors were 37.5 and 80 minutes respectively.

Two identical runs were carried out using the above described procedure and equipment. In Run A, no crystal promoter was added to the second-stage reactor. In Run B, a mixture of 90% "AAS" and 10% sodium sulfate was added to the second-stage reactor at a rate of 1 ml./minute. This mixture was introduced in a total amount equal to 150 p.p.m. of the total liquor in the reactor. Sufficient sodium hydroxide addition was also made to adjust the pH of the second-stage reactor to pH 3.8.

The product slurry produced in each of the second-stage reactors continuously overflowed into receivers from which it was periodically filtered to separate the solids from the mother liquor. The solids were washed with water and dried at 110° C. in a forced-draft oven. The dry product in each case was tested for available chlorine and found to contain 90.8%. This indicated that the product was essentially pure trichlorocyanuric acid. When the processes had reached a steady state of operation, the yield of chlorinated cyanuric acid in each case was found to be 93%, based on the cyanuric acid feed. Microscopic examination of the trichlorocyanuric acid slurries revealed that the crystals of Run A had an average cross sectional area of 500 square microns while the crystals from Run B in which the pH of the second stage was maintained at pH 3.8, had an average area of 13,200 square microns or 26 times that of Run A. The slurry from Run A settled slowly and was difficult to filter and wash. The slurry from Run B settled rapidly and was easily separated from the mother liquor and washed.

EXAMPLE 2.—TWO-STAGE CONTINUOUS CHLORINATION WITH ADDITION OF CRYSTAL PROMOTERS

A chlorination was carried out similar to Example 1, Run B except that in the place of a mixture of "AAS" and sodium sulfate, a mixture of 90% "LAAS" and 10% sodium sulfate was added in an amount equal to 150 p.p.m. of the total liquor in the reactor, and pH was kept at about 3.5 by addition of sodium hydroxide in the second stage. The resulting trichlorocyanuric acid crystals had an average cross sectional area of 5,000 sq. microns. The slurry settled rapidly and was easily separated from the mother liquor.

EXAMPLE 3.—TWO-STAGE CONTINUOUS CHLORINATION WITH ADDITION OF CRYSTAL PROMOTERS

A chlorination was carried out similar to Example 1, Run B except that in the place of a mixture of "AAS" and sodium sulfate, "SLS" was added in an amount equal to 200 p.p.m. of the total liquor in the reactor and the pH kept at about 4.0 by addition of sodium hydroxide in the second stage. The resulting trichlorocyanuric acid crystals averaged 4,000 sq. microns in cross sectional area. This slurry settled rapidly, although not as rapidly as those of Examples 1, Run B and 2.

EXAMPLE 4.—TWO-STAGE CONTINUOUS CHLORINATION WITH ADDITION OF CRYSTAL PROMOTERS

A chlorination was carried out similar to Example 1, Run B, except that in the place of the "AAS" and sodium sulfate mixture, sodium sulfate was added only in an amount equal to 150 p.p.m. of the total liquor in the reactor, and the pH was kept at about 3.0 by addition of sodium hydroxide in the second stage. The resulting trichlorocyanuric acid crystals averaged 4,500 sq. microns per cross sectional area. This slurry settled rapidly, but not as rapidly as those of Examples 1, Run B and 2.

EXAMPLE 5.—TWO-STAGE CONTINUOUS CHLORINATION WITH ADDITION OF CRYSTAL PROMOTERS

A chlorination was carried out similar to Example 1, Run B, except that in the place of "AAS" and sodium sulfate mixture, a mixture of 85% "LAS" and 15% sodium sulfate mixture was added in an amount equal to 150 p.p.m. of the total liquor in the reactor, and the pH was kept at about 3.2 by addition of sodium hydroxide in the second stage. The resulting trichlorocyanuric acid crystals averaged 3,750 sq. microns per cross sectional area. This slurry settled rapidly, although not as rapidly as those of Example 1, Run B, 2, 3 and 4.

EXAMPLE 6.—TWO-STAGE CONTINUOUS CHLORINATION WITH ADDITION OF CRYSTAL PROMOTERS

A chlorination was carried out similar to Example 1, Run B, except that in the place of the "AAS" and sodium sulfate mixture, a mixture of 85% "ABS" and 15% sodium sulfate was added in an amount equal to 200 p.p.m. of the total liquod in the reactor, and the pH was kept at about 3.3 by addition of sodium hydroxide in the second stage. The resulting trichlorocyanuric acid crystals averaged 5,000 sq. microns in cross sectional area. This slurry settled rapidly, although not as rapidly as that of Example 1, Run B.

EXAMPLE 7.—TWO-STAGE CONTINUOUS CHLORINATION WITH ADDITION OF CRYSTAL PROMOTERS

Using the same equipment as described in Example 1, continuous chlorination of disodium cyanurate was carried out. The slurry was prepared by adding purified cyanuric acid to 6.4 weight percent sodium hydroxide solution to give a 2.05 mole ratio of caustic to cyanuric acid. This resulted in a 13.4% mixture of disodium cyanurate. The run was started by filling the first reactor (0.75 liter) with feed solution and adding chlorine until the pH dropped to about 7.0. The feed slurry then pumped in at a constant rate of about 20 ml./minute. Pure chlorine was fed into the mixture at a rate of about 1.3 gm./minute to maintain the pH at 7.0. The reaction mixture of the first-stage reactor was permitted to constantly overflow into the second-stage reactor (1.6 liters) and chlorine was introduced into the second-stage reactor at about 1.18 gm./minute to maintain the pH at about 1.0 in the absence of added caustic. The average retention times in the first and second-stage reactors were 37.5 and 80 minutes respectively.

Two identical runs were carried out using the above procedure and equipment described in Example 1. In Run A, no crystal promoter was added to the second-stage reactor. In Run B, a mixture of 90% "AAS" and 10% sodium sulfate was added to the second-stage reactor in an amount equal to 200 p.p.m. of the total liquor in the reactor. Furthermore, sodium hydroxide solution was also added to adjust the pH to 3.8 by addition of sodium hydroxide in the second stage.

The product slurry produced in each of the second-stage reactors continuously overflowed into receivers from which it was periodically filtered to separate the solids from the liquor. The solids were washed with water and dried at 110° C. in a forced-draft oven. The dry product in each case was tested for available chlorine and found to contain 70.9%. This indicated that the product was essentially pure dichlorocyanuric acid. When the processes had reached a steady steady state of operation, the yield of the chlorinated cyanuric acid in each case was found to be 95% based on the cyanuric acid feed.

Microscopic examination of the dichlorocyanuric acid slurries revealed that the crystals in Run A had an average cross sectional area of 400 sq. microns while the crystals in Run B had an average cross sectional area of 4250 sq. microns. The slurry from Run A settled rapidly and was easily separated from the mother liquor and washed.

EXAMPLE 8.—TWO-STAGE CONTINUOUS CHLORINATION WITH ADDITION OF CRYSTAL PROMOTERS

A chlorination was carried out similar to Example 7, Run B, except that in the place of the 90% "AAS" and 10% sodium sulfate mixture, sodium hydroxide was added only in an amount equal to 1000 p.p.m. of the total liquor in the reactor. The resulting dichlorocyanuric acid crystals averaged 3,375 sq. microns per cross sectional area. This slurry settled rapidly and was easily separated from the mother liquor.

As used herein the designation p.p.m. signifies parts per million.

Pursuant to the requirements of the patent statutes the principle of this invention has been explained and exemplified in a manner whereby it can be practiced by those skilled in the art, such exemplification including what is considered to represent the best embodiment of the invention. However, it is to be undersood that within the scope of the appended claims the invention may be practiced by those skilled in the art and having the benefit of this disclosure otherwise than as specifically described and illustrated herein.

What is claimed is:

1. In the process of producing a chlorinated cyanuric acid from the group consisting of dichlorocyanuric acid, trichlorocyanuric acid and mixtures thereof by reaction of cyanuric acid, aqueous alkali and chlorine in an aqueous reaction mixture, the improvement which comprises forming the crystals of chlorinated cyanuric acid in the presence of a minor amount based on the reactor contents of a crystal promoting agent selected from the class consisting of a surface active, alkali metal alkylsulfate and a surface active, alkali metal alkylarylsulfonate while maintaining the pH from about 1.0 to 4.5 whereby the size of the crystals are increased over those of normally precipitated acid.

2. The process of claim 1 wherein the concentration of the crystal promoting agent is from about 50 p.p.m. to about 500 p.p.m. based on the reactor contents.

3. The process of claim 1 wherein the crystal promoting agent is sodium dodecylbenzene sulfonate.

4. The process of claim 1 wherein the crystal promoting agent is sodium laurylsulfate.

5. In the process of producing a chlorinated cyanuric acid from the group consisting of dichlorocyanuric acid, trichlorocyanuric acid and mixtures thereof by reaction of cyanuric acid, aqueous alkali and chlorine in an aqueous reaction mixture, the improvement which comprises forming the crystals of chlorinated cyanuric acid in the presence of a minor amount based on the reactor contents of a crystal promoting agent selected from the class consisting of a surface active, alkali metal alkylsulfate and a surface active, alkali metal alkylarylsulfonate while adding a minor amount based on the reactor contents of an alkali metal hydroxide while the pH is maintained from about 3.0 to about 4.5 whereby the size of the crystals are increased over those of normally precipitated acid.

6. The process of claim 5 wherein the concentration of the alkali metal hydroxide is from about 500 p.p.m. to about 5000 p.p.m. based on the reactor contents.

7. A process of increasing the crystal size of chlorinated cyanuric acid which comprises adding to a slurry of chlorinated cyanuric acid a minor amount, based on the slurry, of an alkali metal hydroxide while maintaing the pH between about 3.0 and about 4.5 and separating the so treated chlorinated cyanuric acid.

8. The process of claim 7 wherein the alkali metal hydroxide is aqueous sodium hydroxide.

9. In the process of producing a chlorinated cyanuric acid from the group consisting of dichlorocyanuric acid, trichlorocyanuric acid and mixtures thereof which comprises feeding cyanuric acid, aqueous alkali in a molar ratio to the cyanuric acid corresponding to the number of chlorine atoms to be attached to the cyanuric acid and a separate stream of chlorine continuously to a first aqueous reaction zone in which the pH is maintained between about 5 and about 9 and the temperature between about 5° C. and about 40° C., continuously withdrawing a portion of the reaction mixture and feeding it with additional chlorine to a second reaction zone in which the pH is maintained at a lower level than in the first reaction zone and the temperature between about 5° C. and about 20° C., continuously withdrawing reaction product from the second reaction zone and recovering the precipitated chlorinated cyanuric acid from the so withdrawn reaction mixture, the improvement which comprises conducting the chlorination in the presence of a minor amount based on the reactor contents of a crystal promoting agent selected from the class consisting of a surface active, alkali metal alkylsulfate and a surface active, alkali metal alkylarylsulfonate while maintaining the pH of the second reaction zone between about 1.0 and 4.5 whereby the size of the crystals are increased over those of normally precipitated acid.

10. The process of claim 9 wherein the crystal promoting agent is contained in the second reaction zone.

11. The process of claim 9 wherein the crystal promoting agent is sodium dodecylbenzene sulfonate.

12. In the process of producing a chlorinated cyanuric acid from the group consisting of dichlorocyanuric acid, trichlorocyanuric acid and mixtures thereof which comprises feeding cyanuric acid, aqueous alkali in a molar ratio to the cyanuric acid corresponding to the number of chlorine atoms to be attached to the cyanuric acid and a separate stream of chlorine continuously to a first aqueous reaction zone in which the pH is maintained between about 5 and about 9.0 and the temperature between about 5° C. and about 40° C., continuously withdrawing a portion of the reaction mixture and feeding it with additional chlorine to a second reaction zone in which the pH is maintained at a lower level than in the first reaction zone and the temperature between about 5° C. and about 20° C., continuously withdrawing reaction product from the second reaction zone and recovering the precipitated chlorinated cyanuric acid from the so withdrawn reaction mixture, the improvement which comprises conducting the second stage chlorination in the presence of a minor amount, based on the reactor contents, of a crystal promoting agent selected from the class consisting of a surface active, alkali metal alkylsulfonate and a surface active, alkali metal alkylaryl sulfonate while adding to the chlorinated cyanuric acid in the second reaction zone, a minor amount based on the reactor contents, of an alkali metal hydroxide while maintaining the pH of the second reaction zone between about 3.0 and about 4.5 whereby the size of the crystals are increased over those of normally precipitated acid.

13. The process of claim 12 wherein the crystal promoting agent is sodium dodecylbenzene sulfonate and the pH between about 3.5 and about 4.0.

14. In the process of producing a chlorinated cyanuric acid from the group consisting of dichlorocyanuric acid, trichlorocyanuric acid and mixtures thereof which comprises feeding cyanuric acid, aqueous alkali in a molar ratio to the cyanuric acid corresponding to the number of chlorine atoms to be attached to the cyanuric acid and a separate stream of chlorine continuously to a first aqueous reaction zone in which the pH is maintained between about 5 and about 9.0 and the temperature between about 5° C. and about 40° C., continuously withdrawing a portion of the reaction mixture and feeding it with additional chlorine to a second reaction zone in which the pH is maintained at a lower level than in the first reaction zone and the temperature between about 5° C. and about 20°

C., continuously withdrawing reaction product from the second reaction zone and recovering the precipitated chlorinated cyanuric acid from the so withdrawn reaction mixture, the improvement which comprises adding to the chlorinated cyanuric acid slurry in the second reaction zone a minor amount, based on the reactor contents, of an alkali metal hydroxide while maintaining the pH between about 3.0 and 4.5 whereby the size of the crystals are increased over those of normally precipitated acid.

15. The process of claim 14 wherein the alkali metal hydroxide is aqueous sodium hydroxide.

References Cited

UNITED STATES PATENTS

| | | | |
|---|---|---|---|
| 2,913,460 | 11/1959 | Brown et al. | 260—248 |
| 2,969,360 | 1/1961 | Westfall | 260—248 |
| 3,336,228 | 8/1967 | Fuchs et al. | 260—248 XR |

HENRY R. JILES, *Primary Examiner.*

JOHN M. FORD, *Assistant Examiner.*